US012115794B2

(12) United States Patent
Lopez Abancens et al.

(10) Patent No.: US 12,115,794 B2
(45) Date of Patent: Oct. 15, 2024

(54) INTERMEDIATE TANK FOR CONTINUOUS FLUID DELIVERY

(71) Applicant: Hewlett-Packard Development Company, L.P., Spring, TX (US)

(72) Inventors: Jose Antonio Lopez Abancens, Sant Cugat del Valles (ES); Curt Gonzales, Corvallis, OR (US); Miquel Boleda Busquets, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 14 days.

(21) Appl. No.: 17/417,696

(22) PCT Filed: Aug. 2, 2019

(86) PCT No.: PCT/US2019/044973

§ 371 (c)(1),
(2) Date: Jun. 23, 2021

(87) PCT Pub. No.: WO2021/025670

PCT Pub. Date: Feb. 11, 2021

(65) Prior Publication Data

US 2022/0169029 A1 Jun. 2, 2022

(51) Int. Cl.
*B41J 2/175* (2006.01)

(52) U.S. Cl.
CPC ....... *B41J 2/17513* (2013.01); *B41J 2/17596* (2013.01); *B41J 2002/17516* (2013.01)

(58) Field of Classification Search
CPC .... B41J 2/175; B41J 2/17503; B41J 2/17513; B41J 2/17566; B41J 2/17596; B41J 2002/17516; B65D 35/06; B65D 35/08; B65D 31/02
See application file for complete search history.

(56) References Cited

U.S. PATENT DOCUMENTS 4,623,075 A * 11/1986 Riley .................. B65D 77/065 222/394
5,896,151 A 4/1999 Miyazawa
6,106,112 A 8/2000 Okubo et al.
6,540,321 B1 4/2003 Hirano et al.
6,585,359 B1 7/2003 Gasvoda et al.
6,742,882 B2 * 6/2004 Nakamura ................ B41J 2/19 347/92
6,883,905 B2 4/2005 Kimura et al.
7,488,059 B1 * 2/2009 Holland ............... B41J 2/17513 347/85

(Continued)

FOREIGN PATENT DOCUMENTS

CN 1259088 A 7/2000
CN 101318410 A 12/2008

(Continued)

*Primary Examiner* — Anh T Vo
(74) *Attorney, Agent, or Firm* — Jordan IP Law, LLC

(57) ABSTRACT

A fluid tank comprises a rigid container and a bag to receive a fluid. The bag is arranged within the container and comprises a fluid opening to allow a fluid to flow therethrough. A perimeter of the bag extends in a first direction and in a second direction and is supported within the container, such that the perimeter of the bag is movable in no more than the first direction and the second direction.

13 Claims, 4 Drawing Sheets

(56) References Cited

U.S. PATENT DOCUMENTS

| | | | | |
|---|---|---|---|---|
| 7,958,995 | B2 * | 6/2011 | Dedmon | B65D 77/061 206/386 |
| 8,197,041 | B2 | 6/2012 | Morino | |
| 2001/0024225 | A1 * | 9/2001 | Ishizawa | B41J 2/1752 347/86 |
| 2007/0070103 | A1 | 3/2007 | Akune et al. | |
| 2007/0115332 | A1 | 5/2007 | Ishizawa et al. | |
| 2008/0225093 | A1 | 9/2008 | Nozawa | |
| 2011/0012945 | A1 | 1/2011 | Coffey et al. | |
| 2017/0173966 | A1 * | 6/2017 | Kawate | B41J 2/17506 |
| 2019/0127135 | A1 | 5/2019 | Karasawa et al. | |

FOREIGN PATENT DOCUMENTS

| | | | | |
|---|---|---|---|---|
| EP | 0857575 A2 | | 8/1998 | |
| EP | 1013449 A2 | | 6/2000 | |
| EP | 1466738 A1 | | 10/2004 | |
| JP | 2004-123099 A | | 4/2004 | |
| JP | 4379008 | | 12/2009 | |
| JP | 2019104178 | * | 6/2019 | B41J 2/175 |
| WO | WO-2018147870 | | 8/2018 | |

* cited by examiner

INTERMEDIATE TANK FOR CONTINUOUS FLUID DELIVERY

BACKGROUND

Printing devices use a printing fluid, such as ink, obtained from a printing fluid supply, such as an external ink reservoir, to print. The printing fluid is conveyed from the printing fluid supply to a printhead to be printed on a print medium. When the printing fluid is used up, the printing fluid supply is replaced, for which a printing process may be interrupted.

BRIEF DESCRIPTION OF THE FIGURES

FIGS. 2*a*) and 2*b*) represent two different configurations of the bag according to an example.

FIGS. 3*a*) and 3*c*) represent a first rigid container element according to an example and FIGS. 3*b*) and 3*d*) represent a second rigid container element according to an example.

FIGS. 6*a*) and 6*b*) represent two different configurations of the fluid tank according to an example.

DETAILED DESCRIPTION

Figure 1:
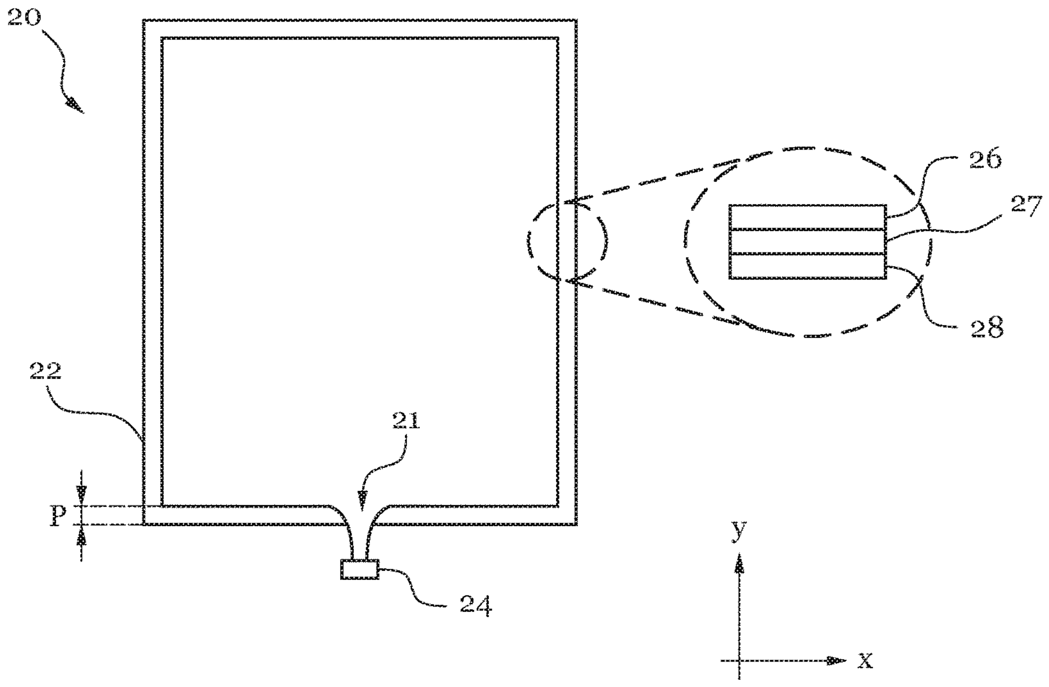
FIG. 1 is a schematic illustration of a bag according to an example.

FIG. 1 is a schematic illustration of a bag 20 according to an example. The bag 20 comprises an outer edge or perimeter 22, which in the example shown has a rectangular shape, but which may have other shapes in other examples. The perimeter 22 of the bag 20 extends in a first direction x and in a second direction y, which in FIG. 1 are mutually perpendicular and coincide with the plane of the drawing.

In the example shown, the bag 20 may extend in the first direction x for a first length, and the bag 20 may extend in the second direction y for a second. The first length may be e.g. 60 mm to 120 mm, or of 80 mm to 100 mm, and the second length may be e.g. 120 mm to 250 mm, or of 160 mm to 200 mm. However, any other shapes and sizes of the bag 20 are also possible.

The bag 20 of FIG. 1 may be formed by two sheets of bag material, which may be substantially identical to each other. The two sheets of bag material may be arranged parallel to each other and mutually joined and sealed, for example thermally welded to each other, at an outer edge of each of the sheets of bag material, thereby forming the perimeter 22 of the bag 20, such that an interior space of the bag 20 is formed between the two sheets of bag material and surrounded, in the plane defined by the first and second directions x and y, by the perimeter 22. In some examples, a perimeter region of the bag 20, which extends around the perimeter 22 of the bag 20, in which the two sheets of bag material are joined together, may have a width P from 0.5 mm to 10 mm, or from 1 mm to 7 mm, or from 3 mm to 6 mm.

FIG. 1 further shows a zoomed-in view of the material composition of the bag 20 or of each of the sheets of bag material that may form the bag 20 according to some examples. The bag 20 may be made of a multilayer bag material comprising a sealing layer 28 to seal a fluid within the bag 20, a barrier layer 27, arranged on the sealing layer 28, which may be impermeable to at least one of water and oxygen, and a protective layer 26, defining an exterior surface of the bag 20. The sealing layer 28 may form an internal layer arranged in contact with the interior of the bag 20. The barrier layer 27 may be an intermediate layer arranged between the sealing layer 28 and the protective layer 26, and the protective layer 26 may be an outermost layer of the bag 20.

The sealing layer 28 may comprise or consist of one or more of polyethylene, ethylene-vinyl acetate (EVA), and an ionomer. The barrier layer 27 may comprise or consist of one or more of metallized PET, aluminum foil, polyvinylidene chloride (PVDC), ethylene vinyl alcohol (EVOH), polyvinyl alcohol (PVOH), polyacrylonitrile (PAN), polyamide MXD6 (PAMXD6), and an inorganic oxide coating, for example alumina or silica. The protective layer 26 may protect the structural integrity of the bag 20, for example by providing protection against abrasion, scratching and piercing. The protective layer 26 may comprise or consist of one or more of polyamide (nylon), oriented polyamide and biaxially oriented polyamide.

The bag 20 further comprises a fluid opening 21 to allow a fluid to flow therethrough, i.e. from an exterior of the bag 20 into an interior of the bag 20 and/or vice versa. The bag 20 may comprise a fluid valve 24 arranged at the fluid opening 21 to control the flow of fluid through the fluid opening. In other examples, the bag 20 may comprise more than one fluid opening, possibly equipped with respective valves, for example a first fluid opening to allow or control a fluid to flow into the bag 20 and a second fluid opening to allow or control the fluid to flow out of the bag 20. In some examples, the aforesaid fluid may be a printing fluid, for example ink. In other examples, the aforesaid fluid may however be or comprise any fluid, for example blood.

If the bag 20 comprises more than one fluid opening and more than one associated valve, the more than one fluid openings and respective valves may be arranged at different positions of the perimeter 22 of the bag 20. For example, a first fluid opening, with a corresponding first fluid valve, may be arranged on one side of the rectangular perimeter 22 represented in FIG. 1, and a second fluid opening, with a corresponding second fluid valve, may be arranged on the same side or on another side of the rectangular perimeter 22.

The bag 20 may be made of non-elastic materials. Non-elastic materials may allow achieving better impermeability to oxygen and water as compared to elastic materials. The bag 20 may have a form variable as a function of a balance of pressures between the interior and the exterior of the bag 20. Such balance of pressures may for example occur when an external pressure is applied upon the exterior surface of the bag 20 by a compression fluid, such as air or a pressure gas, or when internal pressure is applied to the interior walls of the bag 20 by a fluid received within the bag 20, such as ink. The bag hence may expand and be compressed depending on internal and external pressure, substantially without elastic deformation of the bag walls. The bag 20 may e.g. increase its volume to receive a fluid in its interior and may decrease its volume to expel a fluid from its interior.

Figure 2:
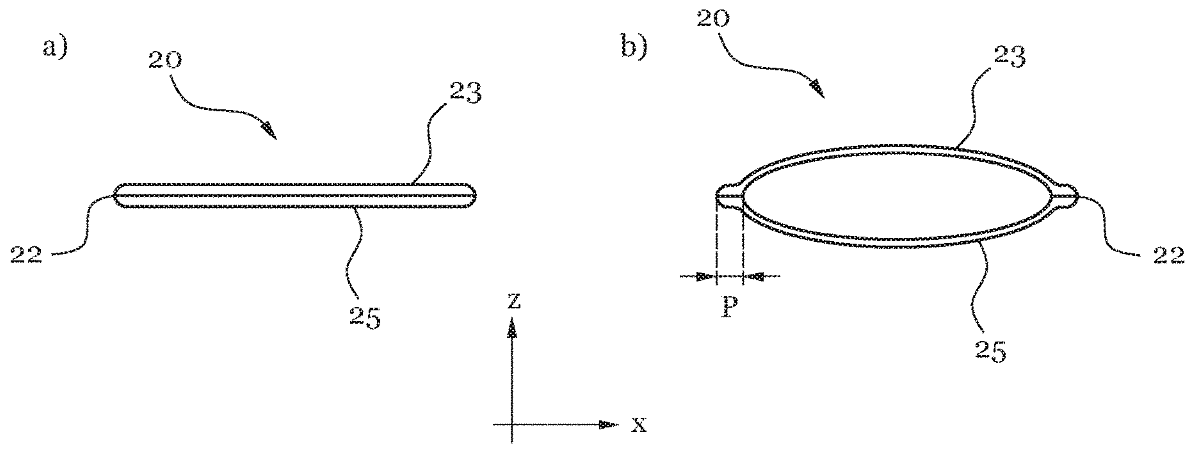
FIG. 2 is a schematic illustration of a bag according to an example.

FIG. 2 schematically shows an example of a variation in the form of the bag 20 depending on a balance of pressures between the interior and the exterior thereof. The bag 20 shown in FIG. 2 comprises a first sheet of bag material 23 and a second sheet of bag material 25. The first sheet of bag material 23 and the second sheet of bag material 25 are mutually joined at their peripheral edges forming the perimeter 22 of the bag 20, for example thermally welded. FIG. 2 schematically represents a bag 20 according to an example as seen from a direction perpendicular to the directions x and y represented in FIG. 1, as seen in the plane defined by the first direction x and by a third direction z perpendicular to each of the first direction x and the second direction y.

FIG. 2, on the left hand side at a), a schematically represents a situation in which the bag 20 is affected by a balance of pressures and the bag 20 is empty, for instance after a fluid has been completely drained from an interior of the bag 20 as a result of a balance of pressures between the interior and the exterior of the bag 20. For example, the fluid may be drained from the bag by an external positive, i.e. compressing, pressure applied to the exterior walls of the bag 20 or by an internal negative, i.e. suctioning, pressure applied to the interior of the bag 20. In this situation, the bag 20 has a substantially planar or flat form extending in the first and second directions x and y represented in FIG. 1, and the first sheet of bag material 23 and the second sheet of bag material 25 extend substantially planar and parallel to each other.

FIG. 2, on the right hand side at b), schematically represents a situation in which the bag 20 is completely or partly filled with a fluid. In this situation, the bag 20 deforms relative to the planar configuration shown in FIG. 2*a*), whereby the exterior walls of the bag 20, which may be formed by the first sheet of bag material 23 and the second sheet of bag material 25, separate from each other such that an interior volume of the bag 20 enclosed by the exterior walls of the bag 20 increases. The bag 20 may deform without substantially stretching due to the pressure applied by the fluid.

In the situation in FIG. 2*b*), the bag 20 no longer has a substantially planar form extending in no more than the first direction x and the second direction y, but further has a non-negligible dimensional component in the third direction z. In the example shown in FIG. 2*b*), the bag 20 has an approximately oval form or lemon-shape in the plane defined by the first direction x and the third direction z. In different examples, the bag 20 may have a capacity of 100 $cm^3$ to 1000 $cm^3$, or of 100 $cm^3$ to 500 $cm^3$, or of 100 $cm^3$ to 200 $cm^3$.

Figure 3:
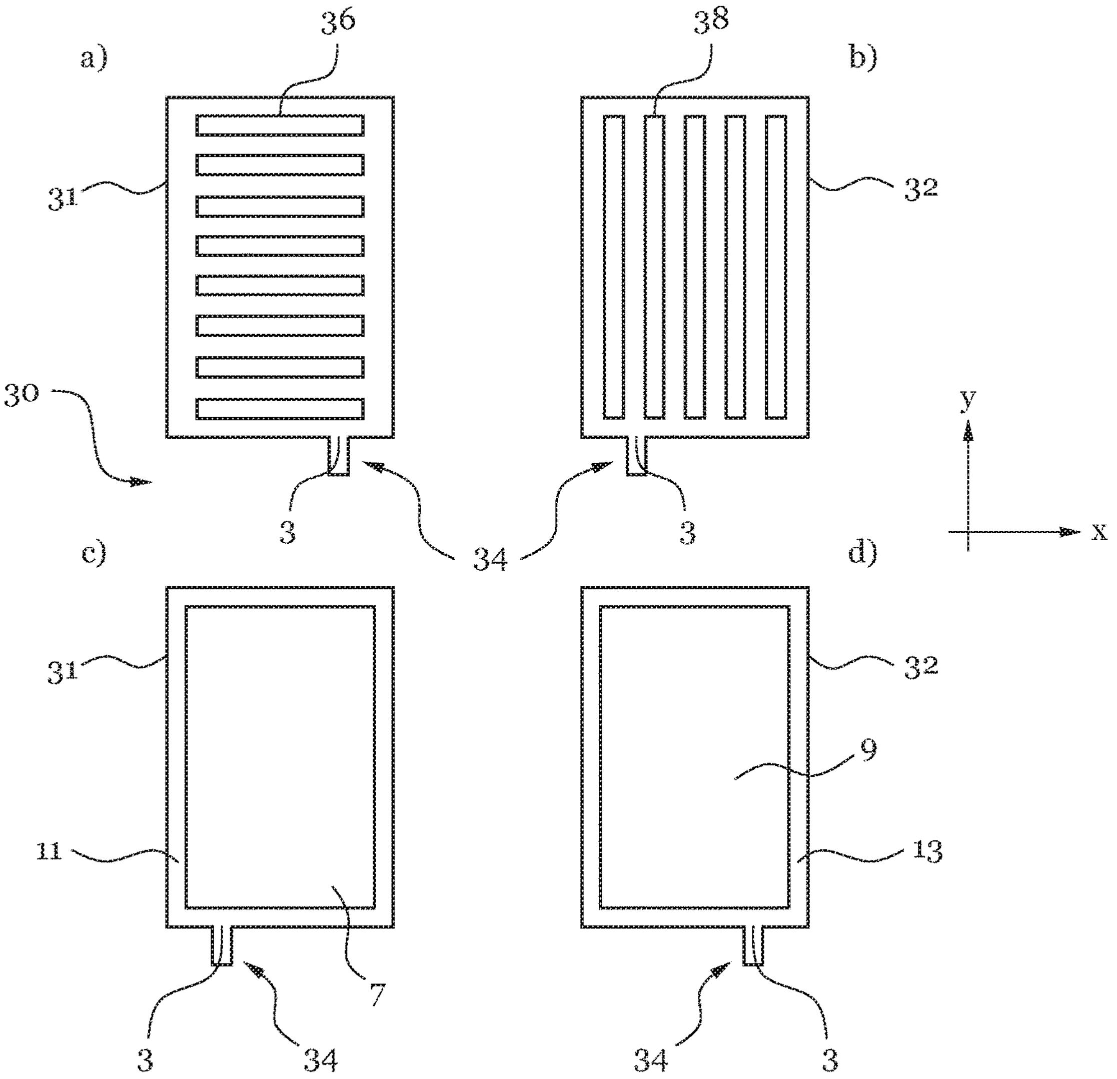
FIG. 3 is a schematic illustration of a rigid container according to an example.

FIG. 3 schematically illustrates a rigid container 30 according to an example. The rigid container 30 may be of a rigid molded plastic or metal material. In the example shown, the rigid container 30 comprises a first container element 31 and a second container element 32. FIG. 3, on the top left, at a) and on the top right at b) show, respectively, two opposite exterior sides of the rigid container 30, respectively corresponding to the first and second container elements 31 and 32. FIG. 3, on the bottom left, at c) and on the bottom right at d) show, respectively, interior views of the rigid container 30, respectively corresponding to the first and second container elements 31 and 32. The first and second rigid container elements 31 and 32 are mutually attachable to form the rigid container 30. Thus, the exterior side of the first container element 31 shown in FIG. 3*a*) and the exterior side of the second container element 32 shown in FIG. 3*b*) form an exterior of the rigid container 30. An interior cross-section of the rigid container 30 at the junction of the first and second rigid container elements 31 and 32 corresponds to the interior of the first container element 31 shown in FIG. 3*c* and to the interior of the second container element 32 shown in FIG. 3*d*. The rigid container 30 shown in FIGS. 3*a*, 3*b*, 3*c* and 3*d* extends in the first direction x and in the second direction y.

The opposite exterior side of the rigid container shown in FIG. 3*a* and the interior cross-section of the rigid container 30 shown in FIG. 3*c* correspond, respectively, to two opposite sides of the first rigid container element 31. The opposite exterior side of the rigid container shown in FIG. 3*b* and the interior cross-section of the rigid container 30 shown in FIG. 3*d* correspond, respectively, to two opposite sides of the second rigid container element 32.

The first container element 31 and the second container element 32 are attachable to each other, for example removably attachable by a clamping mechanism, thereby defining an interior cavity of the container 30 between the first container element 31 and a second container element 32. In some examples, the first container element 31 and a second container element 32 may be welded together.

In some examples, the rigid container 30 may comprise a pressure fluid opening 3 to allow a pressure fluid, such as a pressurized gas or air or a pressurized liquid, like water, to flow into and/or out of the interior of the rigid container 30. In the example shown, the rigid container 30 further comprises a pressure fluid valve 34 arranged at the pressure fluid opening 3 to control the flow of pressure fluid through the pressure fluid opening 3. In other examples, the rigid container may be a sealed rigid container 30 and may comprise a pressurized fluid sealed in its interior.

The interior cavity of the rigid container 30 may be formed by a first interior recess 7 formed at an inner surface of the first container element 31 and a second interior recess 9 formed at an inner surface of the second container element 32. The position and shape of the second interior recess 9 may correspond to the position and shape of the first interior recess 7, such that the second interior recess 9 may overlap the first interior recess 7 and both the first and second interior recesses 7 and 9 may have equal shapes and dimensions. The first interior recess 7 and the second interior recess 9 may be dimensioned such as to receive and accommodate a bag 20 like the bag 20 described with respect to FIGS. 1 and 2. For example, as shown in FIG. 3, the first interior recess 7 and the second interior recess 9 may have a substantially rectangular form, as seen in the plane defined by the first direction x and the second direction y.

The first rigid container element 31 may comprise a first internal rim 11 arranged around a boundary of the first interior recess 7, i.e. surrounding the first interior recess 7, wherein the first internal rim 11 protrudes in the first direction z, that is perpendicularly to the first direction x and to the second direction y, with respect to the plane of the first interior recess 7. Likewise, the second rigid container element 32 may comprise a second internal rim 13 arranged around a boundary of the second interior recess 9, i.e. surrounding the second interior recess 9, wherein the second internal rim 13 protrudes in the first direction z with respect to the plane of the second interior recess 9. The shape and dimensions of the second internal rim 13 may correspond to the shape and dimensions of the first internal rim 11.

In the example shown in FIG. 3, the first and second internal rims 11 and 13 extend around the entire boundary of the first and second interior recesses 7 and 9, respectively. However, in other examples, the first and second internal rims 11 and 13 may partly extend around the boundary of the first and second interior recesses 7 and 9, respectively. For example, each of the first and second internal rims 11 and 13 may discontinuously extend around the boundary of the first and second interior recesses 7 and 9, respectively. In other examples, each of the first and second internal rims 11 and 13 may extend over some sides of the boundary of the first and second interior recesses 7 and 9, respectively, for example over two opposite sides in the case of rectangular-shaped interior recesses 7 and 9, as shown in FIG. 3.

Figure 5:
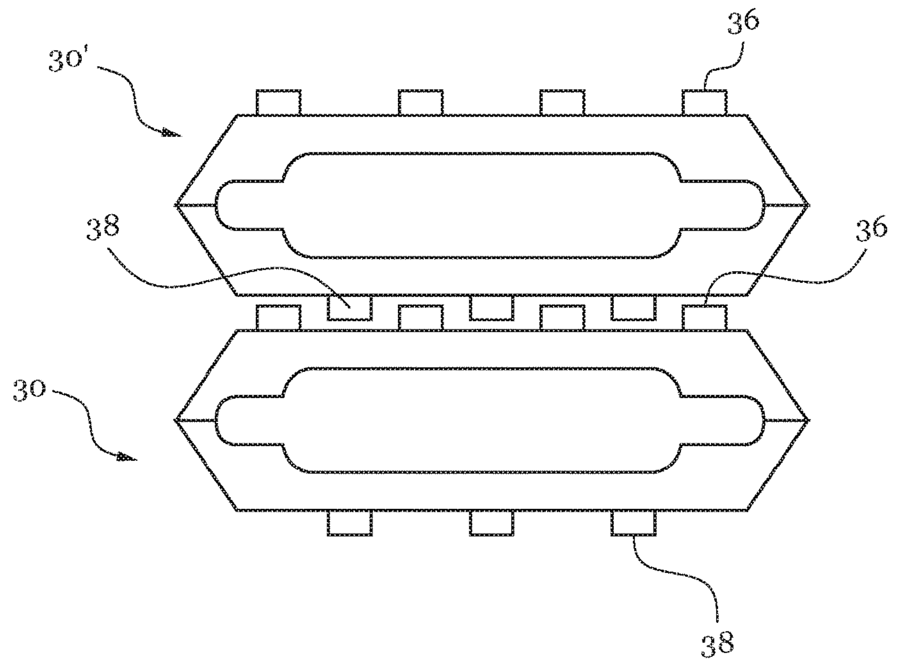
FIG. 5 is a schematic illustration of rigid containers according to an example.

The rigid container 30 may further comprise reinforcement ribs 36, 38 formed on an outer surface of the rigid container 30. One or more reinforcement ribs 36 may be formed on the first container element 31 and may extend in the first direction x. One or more reinforcement ribs 38 may be formed on the second container element 32 and may extend in the first direction x or in the second direction y. Reinforcement ribs extending in other directions and having different shapes, such as a reticular shape (e.g. extending both in the first direction x and in the second direction y) and a honey-comb lattice shape are also possible. The reinforcement ribs 36 and 38 strengthen the rigidity and mechanical stability of the rigid container 30, thereby preventing deformations. Further, the reinforcement ribs 36 and 38 may provide improved stackability of different rigid containers by allowing interlocking the reinforcement ribs 36 of a first rigid container 30 and the reinforcement ribs 38 of a second rigid container 30' arranged on the first rigid container, as shown in FIG. 5.

Figure 4:
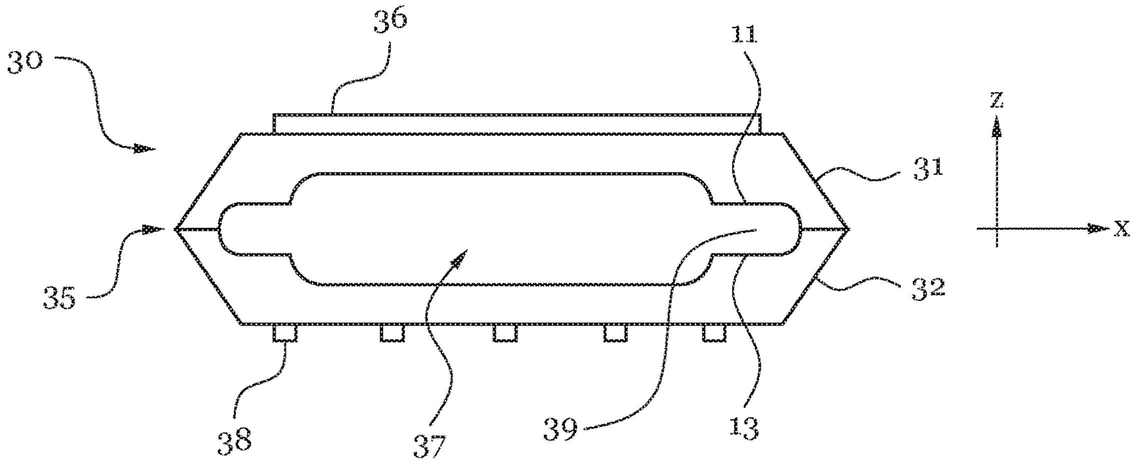
FIG. 4 is a schematic illustration of a rigid container according to an example.

FIG. 4 schematically illustrates a cross section of the rigid container 30 of FIG. 3 in a plane defined by the first direction x and the third direction z (i.e. the same plane as in FIG. 2). In the example shown in FIG. 4, the first container element 31 and the second container element 32 are joined and sealed together at a sealing joint 35, thereby forming the interior cavity 37 that is enclosed between the first container element 31 and the second container element 32.

The first interior recess 7 and the second interior recess 9 may have a substantially semi-oval or semi-lemon-shaped cross-section in the plane defined by the first direction x and the third direction z, such that the interior cavity 37 may have, in in said plane, a substantially oval-shaped or lemon-shaped cross-section. However, other forms of the first interior recess 7, the second interior recess 9 and the interior cavity 37 are possible.

The rigid container 30 may comprise a gap 39 that surrounds the interior cavity 37 and which, in the example shown in FIG. 4, is formed between the first container element 31 and the second container element 32. The gap 39 may correspond to a region of minimal width of the interior cavity 37 in the third direction z or, to a region of minimal distance between the first container element 31 and the second container element 32 (other than at the sealing joint 35). The gap 39 may be formed as an interstice between the first internal rim 11 of the first rigid container element 31 and the second internal rim 13 of the second rigid container element 32.

Also shown in FIG. 4 are reinforcement ribs 36 formed on the first container element 31, which extend in the first direction x, and reinforcement ribs 32 formed on the second container element 32, which extend in the second direction y (i.e. perpendicular to the first and second directions x and z).

In some examples, a width of the gap 39 in the third direction z may be from 0.5 mm to 5 mm or from 1 mm to 2 mm. An length of the gap 39 in the first direction x or in the second direction y, which may correspond to a length of the first internal rim 11 or second internal rim 13, respectively, and in different examples, may be from 0.5 mm to 10 mm, or from 1 mm to 7 mm or, from 3 mm to 6 mm.

Figure 6:
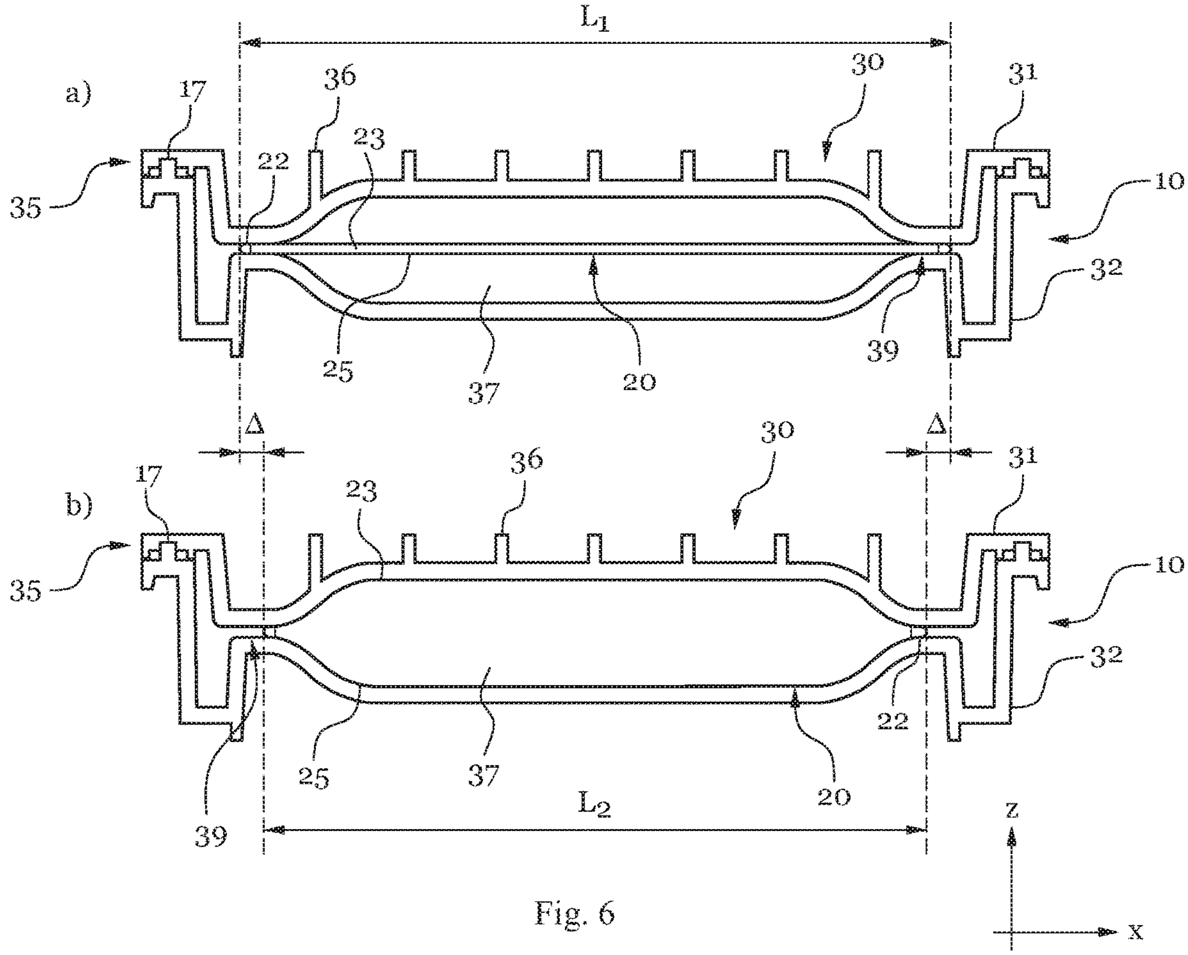
FIG. 6 is a schematic illustration of a fluid tank according to an example.

FIG. 6 schematically shows a cross-section of a fluid tank 10 in the x-z plane, according to an example, which comprises a rigid container 30 and a bag 20 according to the previously discussed examples, wherein the bag 20 is arranged within the rigid container 30. In the example shown, the rigid container 30 comprises a first container element 31 and a second container element 32, wherein the first and second container elements 31, 32 may be attached to each other at a sealing junction 35, for example removably attached by a clamping mechanism 17 or other means.

The bag 20 is arranged within the interior cavity 37 formed between the first container element 31 and the second container element 32. A form or cross-section of the interior cavity 37 in the plane defined by the first direction x and the second direction y may correspond to the form or cross-section of a bag 20 in said plane. Thus, the dimensions and shape of the interior cavity 37 in the x-y plane may be approximately equal to the dimensions and shape of the bag 20 in the x-y plane (cf. FIG. 2).

The bag 20 is received within the rigid container 30 such that it extends in the first direction x and in the second direction y and is supported within the rigid container 30 such that the perimeter 22 of the bag 20 is movable in no more than the first direction x and the second direction y, i.e. in at least one or both of the first and second directions x and y. In FIG. 6, the vertical and horizontal directions of the drawing plane correspond, respectively, to the third direction z and the first direction x, whereas the second direction y is perpendicular to the first and third directions x, z, i.e. perpendicular to the drawing plane.

FIG. 6, on the bottom at a), schematically illustrates a situation in which the bag 20 arranged within the rigid container 30 is empty, corresponding to the situation illustrated in FIG. **2*a*). In this situation, the bag 20 has a substantially planar shape extending in the first direction x and in the second direction y, with almost no significant separation between the sidewalls of the bag 20, e.g. between a first sheet of bag material 23 and the second sheet of bag material 25** in the third direction z.

The bag 20 may be received within the rigid container 30 such that the perimeter 22 of the bag 20 is supported by interior walls of the rigid container 30 in such a manner that a mobility of the perimeter 22 of the bag 20 is restricted in the third direction z by the rigid container 30, while the perimeter 22 of the bag 20 can move within the rigid container 30 in the first direction x and/or in the second direction y. In the example shown, the perimeter 22 of the bag 20 is supported in the gap 39 between the first container element 31 and the second container element 32.

An width of the gap 39 in the third direction z, perpendicular to the first and second directions x and y, in which the perimeter 22 of the bag 20 extends, may be slightly bigger than a thickness of the perimeter 22 of the bag 20 in the third direction z, such that at the rigid container 30, for example by means of the gap 39, restricts the freedom of movement of the perimeter 22 of the bag 20 in the third direction z but without restricting its movement in the first direction x and in the second direction y, for example without rigidly holding or pressing the perimeter 22. The bag hence, to a certain degree, may slide into and out of the gap 39 in one or both of the first direction x and the second direction y.

Indifferent examples, a dimension of the gap 39 in the third direction z, i.e. a width of the gap 39, may be 1.01 to 1.20 times, or 1.01 to 1.10 times or 1.01 to 1.05 times the thickness of the bag 20 in the third direction z. The bag 20 may for instance have a thickness of 1.5 mm and the gap 39 may have a thickness of 1.6 mm.

The gap 39 formed between the first container element 31 and the second container element 32 may have a depth in the first direction x or in the second direction y greater than a width P of the perimeter 22 of the bag 20 (cf. FIGS. 1 and 2) in a corresponding section of the perimeter 22 extending in the second direction y or in the first direction x, respectively.

In particular, an depth of the gap 39 in the first direction x and/or in the second direction y, respectively, may be 1.1 to 5 times or 1.5 to 2.5 times the width P of the perimeter 22 of the bag 20, such that the perimeter 22 may move or slide within the gap 39 and still be supported by the gap 39. For example, the perimeter 22 of the bag 20 may have a width P of 5 mm and the gap 39 may extend in the first direction x and in the second direction y (having, for example, the aforesaid gap thickness of 1.6 mm) for 10 mm, respectively.

When the bag 20 arranged within the rigid container 30 is filled with fluid, for example a printing fluid, such as ink, the bag 20 may change its shape and volume without stretching. However, unlike in the situation depicted in FIG. 2*b*, in which the bag 20 could expand freely, when arranged within the rigid container 30, the bag 20 may expand to the extent that the rigid container 30 allows. FIG. 6*b* schematically illustrates a situation in which the bag 20 arranged within the rigid container 30 is partially or totally filled with fluid. The fluid may enter the interior of the bag 20 through the fluid opening 21 shown in FIG. 1.

As compared to the situation in FIG. 6*a*, in which the bag 20 is substantially planar and extends in the first direction x and the second direction y, the bag 20 in FIG. 6*b* further extends in the third direction z, such that the exterior walls of the bag 20 enclose an interior volume of the bag 20, in which the fluid is received. Thus, the first sheet of bag material 23 and the second sheet of bag material 25 may extend conforming to the interior walls of the rigid container 30.

When the bag 20 is filled with fluid, the pressure generated by the fluid entering the interior of the bag 20 may make the bag 20 change its external contour as seen in the plane defined by the first and third directions x, z, for example transitioning from the substantially planar shape shown in FIGS. 2*a* and 6*a* to the approximately oval or lemon shape shown in FIGS. 2*b* and 6*b*. Meanwhile, the position of the perimeter 22 of the bag 20, at which the sidewalls of the bag 20 are joined together, may remain unchanged in the third direction z.

When transitioning from the situation shown in FIG. 6*a* to the situation shown in FIG. 6*b*, for example due to pressure exercised by fluid entering the bag 20, the overall surface covered by the exterior walls of the bag 20 may remain substantially unchanged, while, its orientation or contour may change. For example, if the bag 20 comprises the first and second sheets of bag material 23 and 25, an overall length of each of the first and second sheets of bag material 23 and 25 measured along the surface of the bag 20 may remain substantially unchanged. However, since the exterior walls of the bag 20 now have a component in the third direction z, an overall length covered by the exterior walls (or by each of the first and second sheets of bag material 23 and 25) in the first direction x, i.e. a projection of the exterior walls of the bag 20 on the first direction x, may change with respect to the situation in FIG. 6*a*.

For example, when the bag 20 is empty and substantially planar, as shown in FIG. 6*a*, the bag 20, in the first direction x, may extend across a first length $L_1$, whereas, when the bag 20 is partially or totally filled with fluid such that the bag 20 conforms to the walls of the interior cavity 37 of the rigid container 30, the bag 20, in the first direction x, may extend across a second length $L_2$ smaller than the first length $L_1$, as shown in FIG. 6*b*. The second length $L_2$ corresponds to a projection of the bag 20 upon the first direction x. An analogous situation may apply to corresponding lengths covered by the bag 20 in the second direction y.

As a consequence of the change in the shape of the bag 20, the perimeter 22 of the bag 20 may move or slide in the first direction x and in the second direction y within the rigid container 30, for example within the gap 39, in order to accommodate the increase in the volume of the bag 20 without stretching. The perimeter 22 of the bag 20 may move freely in the first direction x and in the second direction y but movement may be restricted by the rigid container 30 in the third direction z.

As shown in FIG. 6, the rigid container 30 may limit the expansion of the bag 20, such that the perimeter 22 of the bag 20 is movable in no more than the first direction x and the second direction y by a distance Δ, which may correspond to a difference between the aforesaid first length $L_1$ and the aforesaid second length $L_2$ (i.e. $L_1-L_2=\Delta$). Thus, when the bag 20 is filled with fluid, an outer edge of the bag 20 may be displaced within the rigid container in the first and second directions x and y, for example within the gap 39, as compared to the situation shown in FIG. 6*a*, by the distance Δ. The distance Δ may be smaller than a depth of the gap 39 in the first and second directions x and y, and may further be smaller than the perimeter width P (cf. FIG. 2). In some examples, the distance Δ may be at least 10 mm, at least 5 mm, or at least 2 mm.

The rigid container 30 may be dimensioned such that, in the situation shown in FIG. 6*b*, i.e. when the bag 20 is filled with fluid, the bag 20 may completely occupy the interior of the rigid container 30 and may conform thereto. Thus, the rigid container 30 may limit the deformation of the bag 20 and may define the form, size and volume that the bag 20 may have within the rigid container 30 when the bag 20 is filled with fluid. For example, when the bag 20 is completely filled with fluid, the bag 20 may completely occupy the interior cavity 37 of the rigid container 30.

Thus, the volume of the interior of the rigid container 30, e.g. the volume of the interior cavity 37, controls a maximal capacity of the bag 20 when the bag 20 is arranged within the rigid container 30.

The transition from the situation shown in FIG. 6*a* to the situation shown in FIG. 6*b* may be reversed by pressurizing the interior of the rigid container 30, for example by letting a pressure fluid, such as air, flow into the interior cavity 37 through the pressure fluid valve represented in FIG. 3. In some examples, water may be used as a pressure fluid, for example water at a predefined temperature to regulate a temperature of the fluid in the bag 20. In examples in which the rigid container 30 comprises a pressurized fluid sealed in its interior, the interior of the rigid container may be pressurized as a consequence of fluid entering the bag 20. In some examples, fluid may be drained from the interior of the bag 20 by a suctioning pressure, provided for example by a suction pump.

As a result, the fluid contained within the bag 20 may be expelled, for example through the fluid opening 21 shown in FIG. 1 or through another opening of the bag 20, to the exterior of the bag 20, such that the perimeter 22 of the bag 20 moves back within the gap 39 towards the position and form it had, as shown in FIG. 6*a*, when the bag 20 was empty (e.g. by the distance Δ).

The fluid tank 10 allows storing fluid and controlling a flow of fluid into the bag 20 and out of the bag 20. The rigid container 30 limits the deformation of the bag 20, such that the bag 20 does not substantially shrink, stretch, or fold during use, for example when being compressed to eject fluid or when being filled or refilled with new fluid. The rigid container 30 allows the perimeter 22 of the bag 20 to move in the first and/or second direction x, y to react to changes of form and volume of the bag 20 due to fluid entering or exiting the bag 20 without having to shrink, stretch or bend abruptly, thereby reducing material fatigue of the bag. As a result, the bag 20 may be suitable for withstanding a large number, for example up to 300,000, empty-and-refill cycles without puncturing or tearing, and hence without requiring replacement.

Figure 7:
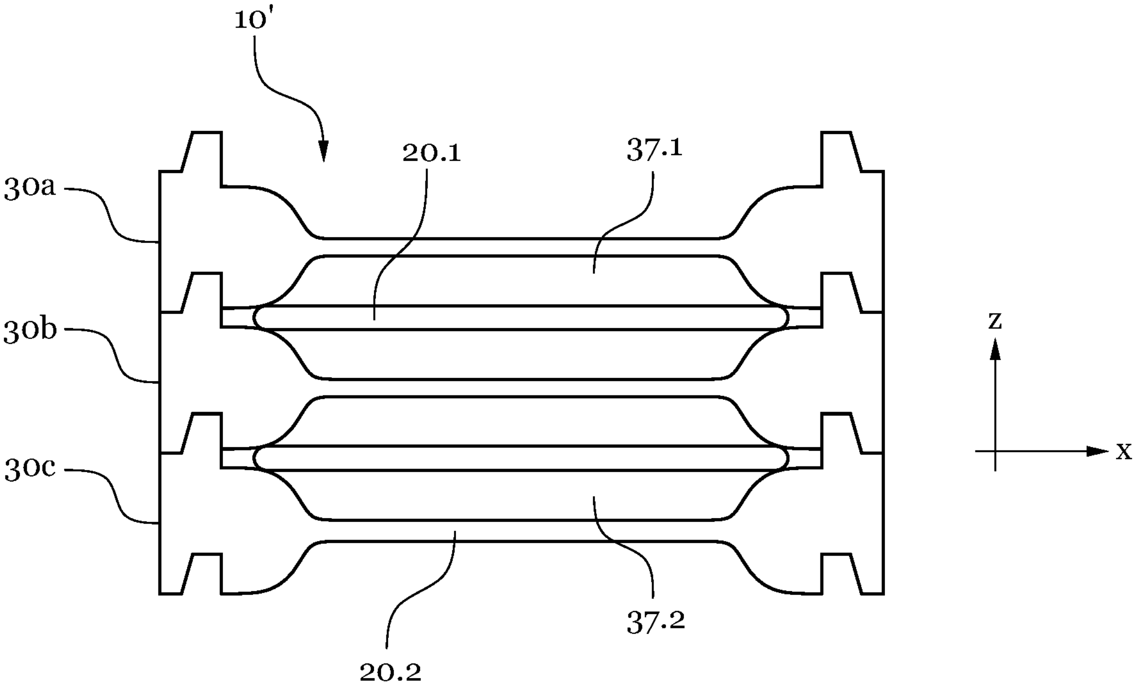
FIG. 7 is a schematic illustration of a fluid tank according to an example.

FIG. 7 shows a schematic representation of a fluid tank 10' according to an example comprising a first rigid container element 30*a*, a second rigid container element 30*b* and a third rigid container element 30*c*. The first rigid container element 30*a* is arranged on the second rigid container element 30*b*, and the second rigid container element 30*b* is arranged on the third rigid container element 30*c*. The first, second and third rigid container elements 30*a*, 30*b* and 30*c* are modular elements having the same or similar geometry and can be attached, for example removably attached, to each other in a stacked configuration, as shown in FIG. 7.

The fluid tank 10' further comprises a first bag 20.1 arranged between the first rigid container element 30*a* and the second rigid container element 30*b* and a second bag 20.2 arranged between the second rigid container element 30*b* and the third rigid container element 30*c*. Although three rigid container elements and two bags are represented in FIG. 7, this is a non-limiting example and a fluid tank may comprise any number of rigid container elements and any number of bags.

The first bag 20.1 and the second bag 20.2 may correspond to a bag according to any of the previously discussed examples, including the bag 20 discussed with respect to FIGS. 1 and 2. Each of the first and second bags 20.1 and 20.2 has a perimeter that extends in a first direction x, indicated in FIG. 7 as coincident with the horizontal direction of the drawing plane, and in a second direction y perpendicular to the first direction x, which in FIG. 7 is perpendicular to the drawing plane (analogous to the previously discussed first and second directions x and y).

In the configuration shown in FIG. 7, the first rigid container element 30*a* and the second rigid container element 30*b* in combination, and the second rigid container element 30*b* and the third rigid container element 30*c* in combination act, respectively, as a printed fluid tank according to any of the previously discussed examples.

The perimeter of the first bag 20.1 may be supported within a gap between the first rigid container element 30*a* and the second rigid container element 30*b*, such that the perimeter of the first bag 20.1 is movable in no more than the first direction x and the second direction y. Like in the previously discussed examples, the gap formed between the first rigid container element 30*a* and the second rigid container element 30*b* may limit the mobility of the perimeter of the first bag 20.1 in the third direction z, thereby avoiding that the first bag may fold abruptly, stretch or shrink when it is filled with fluid or emptied of fluid.

Likewise, the second bag 20.2 may be supported within a gap between the second rigid container element 30*b* and the third rigid container element 30*c*, such that the perimeter of the second bag 20.2 is movable in no more than the first direction x and the second direction y.

The first rigid container element 30*a* may be attached, for example removably attached by means of an interlocking mechanism or a clamping mechanism, to the second rigid container element 30*b*, such that a first cavity 37.1 is formed between the first rigid container element 30*a* and the second rigid container element 30*b*. Likewise, the second rigid container element 30*b* may be attached or removably attached to the third rigid container element 30*c*, such that a second cavity 37.2 is formed between the second rigid container element 30*b* and the third rigid container element 30*c*.

The first bag 20.1 is arranged within the first cavity 37.1 and the second bag 20.2 is arranged within the second cavity 37.2. The first and second cavities 37.1 and 37.2 may be dimensioned such that, when the first and second bags 20.1 and 20.2 are filled with fluid, the first and second bag 20.1 and 20.2 completely fills and occupies, respectively, the first cavity 37.1 or the second cavity 37.2.

When the first and second bags 20.1 and 20.2 are filled with fluid, an exterior surface of the first bag 20.1 may conform to the interior walls of the first rigid container element 30*a* and the second rigid container element 30*b* that form the first cavity 37.1 and an exterior surface of the second bag 20.2 may conform to the interior walls of the second rigid container element 30*b* and the third rigid container element 30*c* that form the first cavity 37.2.

Each of the first, second and third rigid container elements 30*a*, 30*b* and 30*c* may be formed of a rigid plastic or metal material by molding, wherein the same mold may be used for forming the first, second and third rigid container elements 30*a*, 30*b* and 30*c*, since they are modular elements having substantially identical geometries. The modular structure hence decreases manufacturing costs and further allows easily accessing the interior cavities 37.1 and 37.2, for example if necessary for replacing the first bag 20.1 or the second bag 20.2.

Figure 8:
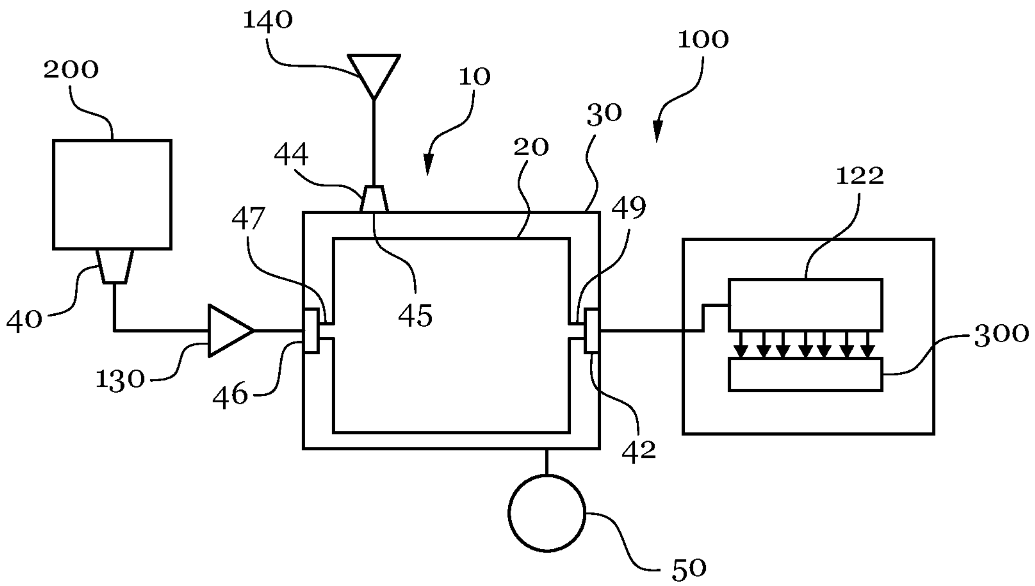
FIG. 8 is a schematic illustration of a printing device according to an example.

FIG. 8 shows a schematic representation of a printing device 100 according to an example. The printing device 100 comprises a printing fluid inlet 40 to receive a printing fluid from a printing fluid supply 200. The printing fluid inlet 40 may be a printing fluid port connectable or connected to the printing fluid supply 200. The printing fluid supply 200 may be a consumable ink cartridge.

The printing device 100 further comprises an intermediate printing fluid tank 10 connected to the printing fluid inlet 40 to receive printing fluid from the printing fluid inlet 40. The intermediate printing fluid tank 10 can hence receive printing fluid from the printing fluid supply 200 through the printing fluid inlet 40.

The printing fluid tank 10 may correspond to a printing fluid tank according to any of the previously discussed examples and comprises a rigid container 30 and a bag 20 arranged therein. In other examples, the printing device 100 may comprise in addition to or instead of the printing fluid tank 10, more than one printing fluid tanks, for example a plurality of printing fluid tanks 10, 10' arranged in a staggered configuration as shown in FIG. 5 or a plurality of modular rigid container elements 30*a*, 30*b*, 30*c*, with a corresponding plurality of bags 20.1, 20.2, as shown in FIG. 7.

The printing device 100 further comprises, a printhead 122 to print a print medium 300 with printing fluid. The printhead 122 may be connected or connectable to the intermediate printing fluid tank 10 to receive printing fluid from the intermediate printing fluid tank 10. The printhead 122 prints the print medium 300 with the printing fluid by firing the printing fluid upon a surface of the print medium 300.

The rigid container 30 of the intermediate printing fluid tank 10 may comprise a pressure fluid valve 44 to control a flow of air into and out of the interior of the rigid container 30 through a corresponding pressure fluid opening 45 and a printing fluid valve 46 to control a flow of printing fluid from the printing fluid inlet 40 into the bag 20 through a first printing fluid opening 47. As shown in FIG. 8, the printing device 100 may further comprise a second printing fluid valve 42 to control a flow of printing fluid from the interior of the bag 20 to the printhead 122 through a second printing fluid opening 49. Each of the printing fluid valve 40, the second printing fluid valve 42 and pressure fluid valve 44 may be self-sealing valves, which automatically seal when they are not actively actuated.

Thus, printing fluid may flow from the printing fluid supply 200 to the printhead 122 through the printing fluid tank 10, i.e. through the first printing fluid opening 47 and the second printing fluid opening 49, driven by pressure exercised by pressure fluid, for example pressurized gas such as air, in the rigid container 30 through the pressure fluid opening 45. The pressure inside the rigid container 30 may be monitored using a pressure sensor 50 connected to the interior of the rigid container 30. In some examples, the printing fluid may further flow directly from the printing fluid supply 200 to the printhead 122, such that the printhead 122 may receive printing fluid both directly from the printing fluid supply 200 and from the printing fluid tank 10.

The bag 20 is such that, printing fluid received within the bag 20 can be driven out of the bag by a difference of pressures between the interior and the exterior of the bag 20. For example, when pressure fluid, such as compressed air or water, is pumped into the interior of the rigid container 30, the bag 20 may be compressed by the pressure fluid, thereby ejecting printing fluid through the second printing fluid opening 49 (and possibly also through the printing fluid valve 42) to the printhead 122.

A perimeter of the bag 20 (not shown in FIG. 8 but similar to the perimeter 22 of the bag 20 discussed with respect to FIGS. 1, 2, and 6) extends in a first direction and in a second direction. The rigid container 30 limits an expansion of the bag 20, such that the perimeter of the bag 20 is movable in no more than the first direction and the second direction. The first and second directions may correspond, respectively, to the first and second directions x and y discussed within the context of the previously presented examples. Thus, when printing fluid enters or exits the bag 20, the perimeter 22 of the bag 20 is movable in no more than the first direction x and the second direction y.

According to some examples, the printing device 100 may further comprise a printing fluid pump 130 to pump printing fluid from the printing fluid inlet 40 into the bag 20 of the printing fluid tank 100 through the first printing fluid opening 47 and the first printing fluid valve 46. Additionally or alternatively, the printing device 100 may further comprise a pressure fluid pump 140 to pump air into the interior of the rigid container 30 through the pressure fluid opening 45 and the pressure fluid valve 44.

The printing fluid tank 10 may act as an intermediate printing fluid reservoir to store printing fluid in an intermediate stage between the printing fluid supply 200 and the printhead 122, such that the printing fluid supply 200 can be replaced without interrupting a printing process. A printing fluid supply 200 that has been used up can be replaced without interrupting a printing process, i.e. while the printhead 122 continues to print a print medium 300 using printing fluid received from the intermediate printing fluid tank 10.

The invention claimed is:

1. A fluid tank comprising:

a rigid container, wherein the rigid container comprises a pressure fluid valve to control a flow of a pressure fluid therethrough; and at least one bag to receive a fluid, wherein the at least one bag includes two sheets that are joined together and arranged within the rigid container, wherein the at least one bag comprises a fluid opening to allow a fluid to flow therethrough, and wherein a perimeter of the at least one bag where the two or more sheets are joined together extends in a first direction and in a second direction and is supported within a gap between a first rigid element and a second rigid element of the rigid container, such that the perimeter of the at least one bag is movable in no more than the first direction and the second direction, the perimeter to move in the first direction within the gap when the at least one bag is filled with the fluid, wherein each of the two sheets is made of a multilayer bag material comprising a sealing layer to seal the fluid between the two sheets, a barrier layer impermeable to water and oxygen, and a protective layer.

2. The fluid tank of claim 1, wherein the rigid container is dimensioned such that, when the at least one bag is filled with the fluid, the at least one bag conforms to the interior of the rigid container, such that the rigid container limits a deformation of the bag.

3. The fluid tank of claim 1, wherein a volume of the interior of the rigid container corresponds to a capacity of the at least one bag when the at least one bag is arranged within the rigid container.

4. The fluid tank of claim 1, wherein the rigid container limits the expansion of the at least one bag, such that the perimeter of the at least one bag is movable in no more than the first direction and the second direction by at least 10 mm, at least 5 mm, or at least 2 mm.

5. The fluid tank of claim 1, wherein the two sheets of the at least one bag are mutually sealed at an outer edge thereof forming the perimeter of the at least one bag.

6. The fluid tank of claim 1, wherein the rigid container comprises reinforcement ribs on an outer surface thereof.

7. The fluid tank of claim 1, wherein the rigid container comprises a first rigid container element and a second container element, wherein the first container element and the second container element are attachable to each other, thereby defining the interior of the rigid container between the first container element and the second container element.

8. The fluid tank of claim 1, further comprising a fluid valve arranged at the fluid opening to control a flow of fluid into and out an interior of the at least one bag.

9. The fluid tank of claim 1, wherein the at least one bag has a first length before the at least one bag is filled within the fluid and the at least one bag has a second length after the at least one bag is filled with the fluid.

10. A fluid tank comprising:

a first rigid container element, a second rigid container element, and a third rigid container element, and first and second bags to receive a fluid, wherein the first bag is arranged between the first rigid container element and the second rigid container element, and wherein the second bag is arranged between the second rigid container element and the third rigid container element;

wherein the first, second and third rigid container elements are modular elements of same or similar geometry and are to be attached in a stacked configuration, the first bag having a perimeter located in a gap between the first rigid container element and the second rigid container element, the perimeter to move within the gap when the first bag is filled with the fluid, and the second bag having a perimeter located in a gap between the second rigid container element and the third rigid container element, the perimeter to move within the gap when the second bag is filled with the fluid, wherein a rigid container comprises the first rigid container element, the second rigid container element, and the third rigid container element and the rigid container further comprises a pressure fluid valve to control a flow of a pressure fluid therethrough, wherein the first bag and second bag are made of a multilayer bag material comprising a sealing layer to seal the fluid within the first bag and the second bag, a barrier layer impermeable to water and oxygen, and a protective layer.

11. The fluid tank of claim 10, wherein the first rigid container element is attached to the second rigid container element, thereby defining a first cavity between the first rigid container element and the second rigid container element, with the first bag arranged in the first cavity, and wherein the second rigid container element is attached to the third rigid container element, thereby defining a second cavity between the second rigid container element and the third rigid container element, the second bag arranged in the second cavity.

12. A printing device comprising:

a printing fluid inlet to receive a printing fluid from a printing fluid supply, an intermediate printing fluid tank connected to the printing fluid inlet to receive printing fluid from the printing fluid inlet, and a printhead to print a print medium with printing fluid, wherein the printhead is connectable to the printing fluid tank to receive printing fluid from the intermediate printing fluid tank, wherein the intermediate printing fluid tank comprises:

a rigid container, wherein the rigid container comprises a pressure fluid valve to control a flow of a pressure fluid therethrough;

at least one bag to receive printing fluid, wherein the at least one bag is arranged within the interior of the rigid container, wherein the at least one bag comprises a printing fluid opening to allow a flow of printing fluid from the printing fluid inlet into the at least one bag or from the at least one bag to the printhead, wherein the at least one bag is such that printing fluid received within the at least one bag is to be driven out of the at least one bag by a difference of pressures between the interior and the exterior of the at least one bag, wherein a perimeter of the at least one bag extends in a first direction and in a second direction and is supported within a gap between a first rigid element and a second rigid element of the rigid container, the perimeter to move in the first direction within the gap when the at least one bag is filled with the printing fluid, wherein the at least one bag is made of a multilayer bag material comprising a sealing layer to seal the printing fluid within the bag, a barrier layer impermeable to water and oxygen, and a protective layer, and wherein the rigid container limits the expansion of the at least one bag when printing fluid enters or exits the at least one bag, such that a perimeter of the at least one bag is movable in no more than the first direction and the second direction.

13. The printing device of claim 12, wherein the rigid container comprises a pressure fluid opening to allow a flow of pressure fluid into or out of an interior of the rigid container, wherein the printing device further comprises:

a printing fluid pump to pump printing fluid from the printing fluid inlet into the at least one bag, and a pressure fluid pump to pump air into the interior of the rigid container.

* * * * *